United States Patent [19]
Enomoto

[11] Patent Number: 5,322,005
[45] Date of Patent: Jun. 21, 1994

[54] HIGH CAPACITY COFFEE MAKER WITH IMPROVED FILTRATION

[75] Inventor: Kazuo Enomoto, Kobe, Japan

[73] Assignee: Nichimen Corporation, Tokyo, Japan

[21] Appl. No.: 73,642

[22] Filed: Jun. 9, 1993

Related U.S. Application Data

[63] Continuation of Ser. No. 813,453, Dec. 26, 1991, abandoned, which is a continuation-in-part of Ser. No. 474,046, Apr. 24, 1990, Pat. No. 5,083,502.

[30] Foreign Application Priority Data

Sep. 2, 1988 [JP] Japan ................... 63-116173
Dec. 26, 1990 [JP] Japan ................... 2-417843

[51] Int. Cl.⁵ .......................................... A47J 31/42
[52] U.S. Cl. ........................................ 99/282; 99/286; 99/289 R; 99/300; 99/304; 34/66; 241/65; 241/100
[58] Field of Search ............... 34/20, 57 R, 57 B, 65, 34/66; 241/65, 100; 426/433; 99/280–283, 286–288, 289 R, 290, 300, 304, 307

[56] References Cited

U.S. PATENT DOCUMENTS

| | | | |
|---|---|---|---|
| 1,063,188 | 6/1913 | De Simone | 241/65 X |
| 1,345,477 | 7/1920 | Cappelli | 99/286 |
| 1,896,230 | 2/1933 | Farago | 241/65 X |
| 2,154,963 | 4/1939 | Swager | 241/65 X |
| 2,282,708 | 5/1942 | Dantzig | 99/286 X |
| 2,906,193 | 9/1959 | McCauley | 99/286 X |
| 3,153,377 | 10/1964 | Bosak | 99/280 |
| 3,279,925 | 10/1966 | Cowley | 426/433 X |
| 4,196,658 | 4/1980 | Takagi et al. | 99/286 |
| 4,325,191 | 4/1982 | Kumagai et al. | 99/286 X |
| 4,406,217 | 9/1983 | Oota | 99/280 |
| 4,510,853 | 4/1985 | Takagi | 241/65 X |
| 4,683,666 | 8/1987 | Igusa et al. | 34/67 |
| 4,895,308 | 1/1990 | Tanaka | 99/286 X |

FOREIGN PATENT DOCUMENTS

| | | | |
|---|---|---|---|
| 213645 | 3/1987 | European Pat. Off. | 99/286 |
| 288870 | 11/1988 | European Pat. Off. | 99/286 |
| 3636999 | 5/1988 | Fed. Rep. of Germany | 99/286 |

*Primary Examiner*—Philip R. Coe
*Assistant Examiner*—Charles Cooley
*Attorney, Agent, or Firm*—Kenyon & Kenyon

[57] ABSTRACT

A coffee making apparatus comprises a roaster for roasting dried coffee beans, a tank having a meshed case for temporarily storing roasted coffee beans, a blower which sends air to the roasted coffee beans in the meshed case to cool the roasted coffee beans, a milling-/extracting unit receiving the cooled roasted coffee beans from the tank for milling the roasted coffee beans and thereafter extracting a coffee solution therefrom by pouring hot water, a coffee server for receiving the coffee solution which has been extracted, and a case in which the roaster, the tank, and the milling/extracting unit are provided.

7 Claims, 7 Drawing Sheets

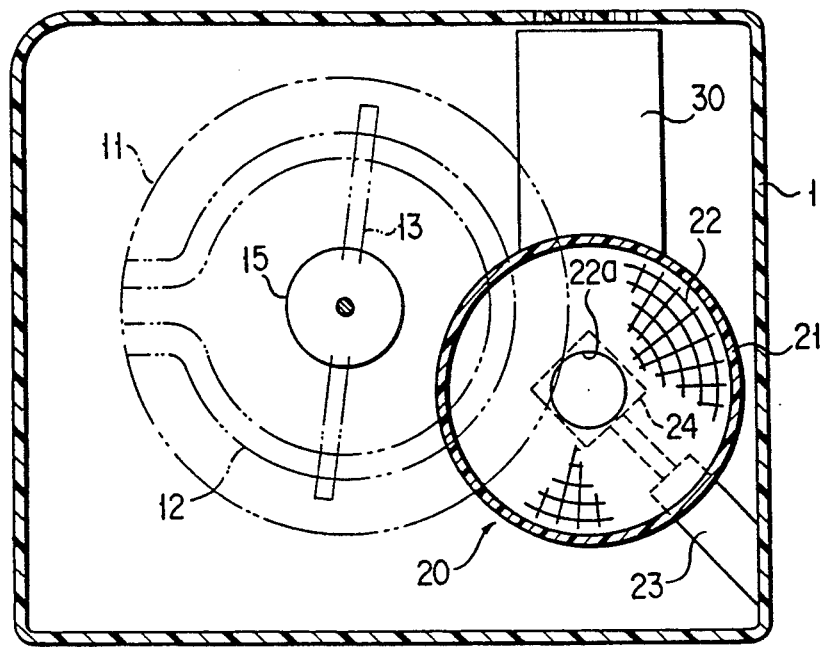
F I G. 2
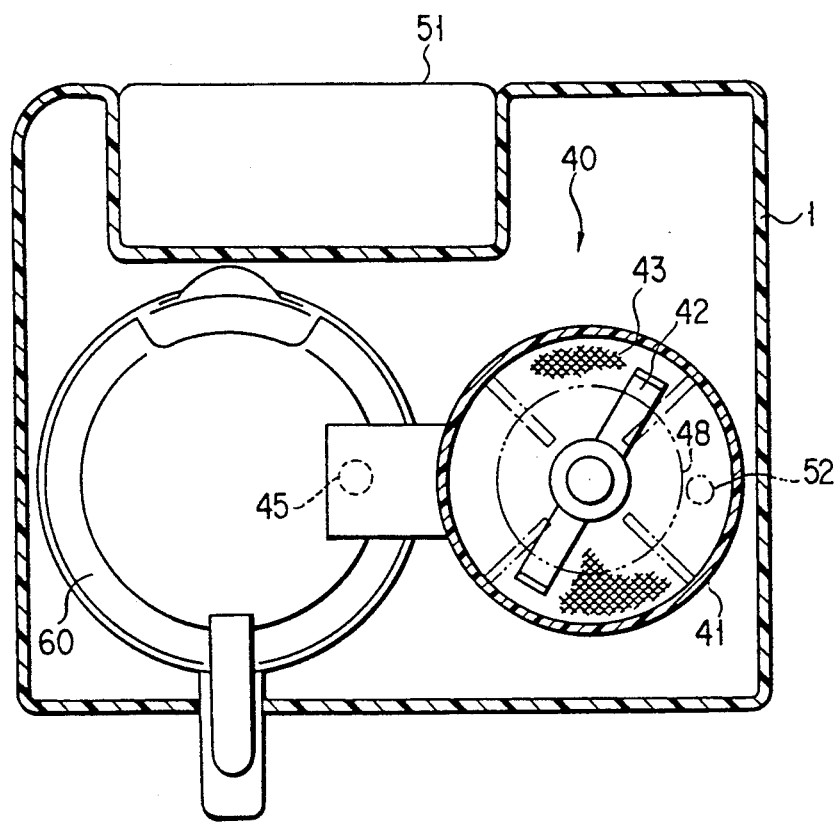
F I G. 3

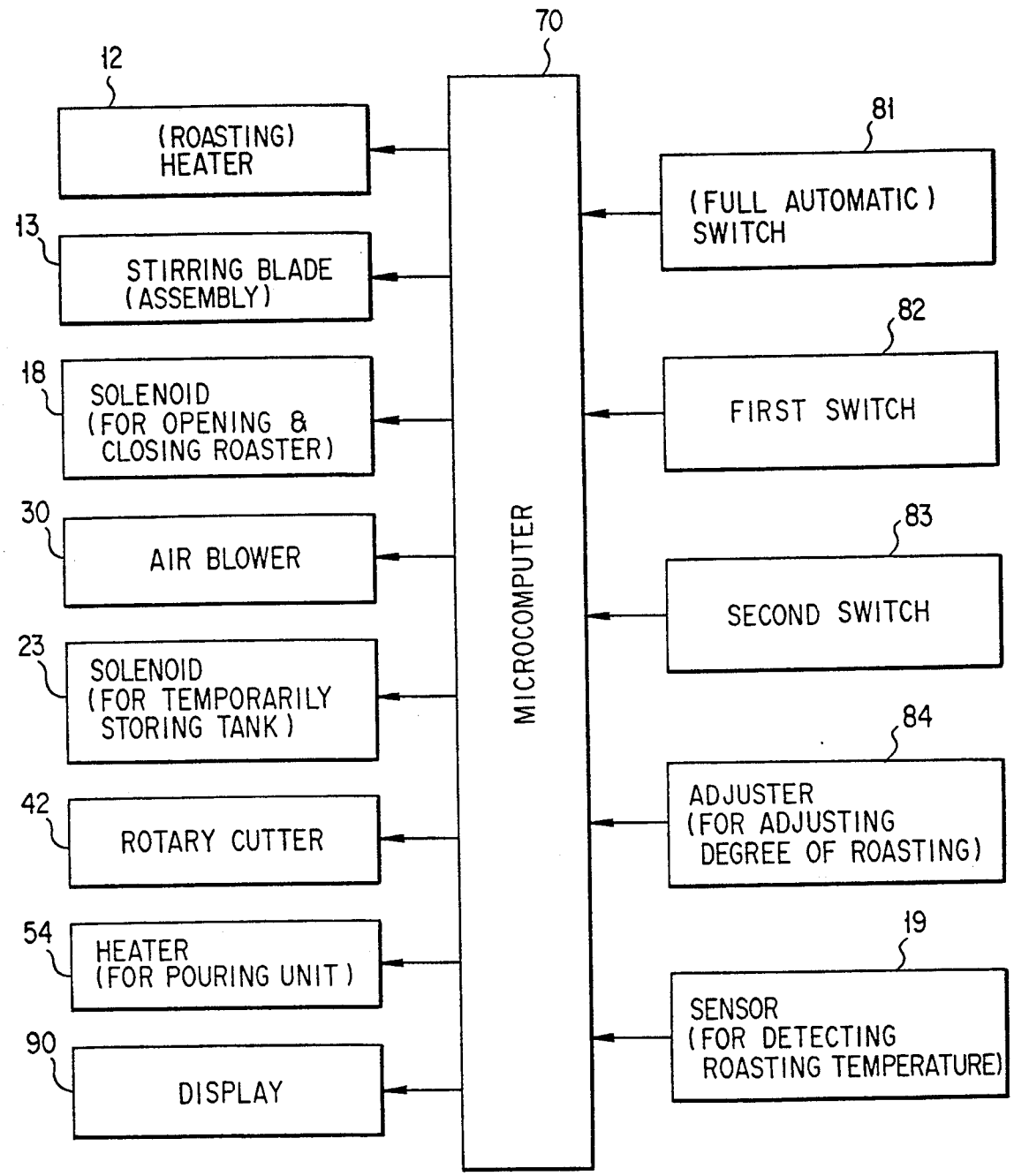
F I G. 7

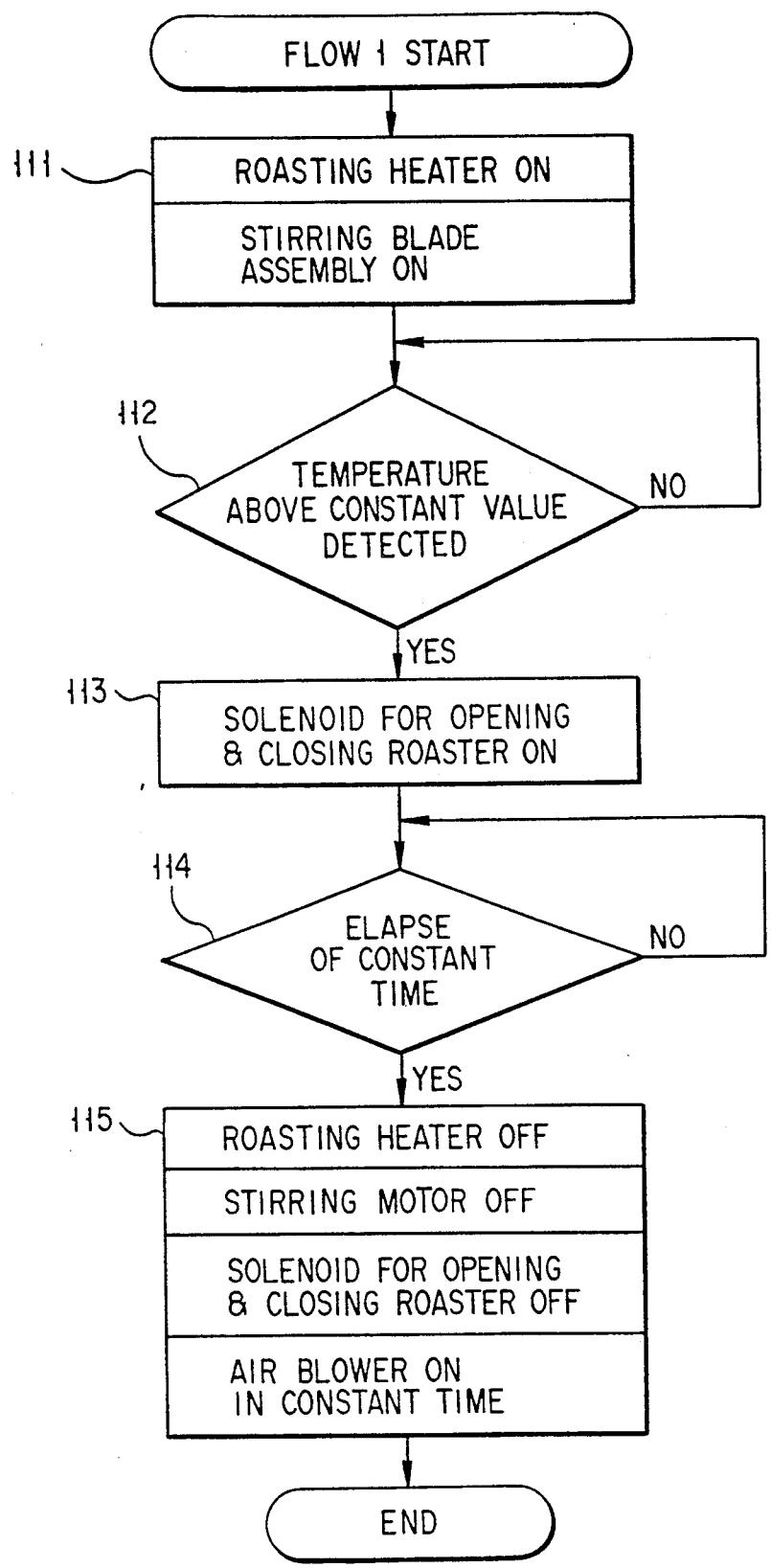
F I G. 9

HIGH CAPACITY COFFEE MAKER WITH IMPROVED FILTRATION

This application is a continuation of copending U.S. patent application Ser. No. 07/813,453, filed on Dec. 26, 1991, now abandoned, which is a continuation-in-part of U.S. patent application Ser. No. 07/474,046, filed on Apr. 24, 1990, now U.S. Pat. No. 5,083,502.

BACKGROUND OF THE INVENTION

1. Field of the Invention

This invention relates to a coffee making apparatus for obtaining coffee from unroasted dried coffee beans through the steps of roasting the unroasted dried coffee beans, milling the roasted coffee beans and extracting the coffee granules.

2. Description of the Prior Art

The inventor of this invention proposed a coffee making apparatus for automatically obtaining coffee from unroasted dried coffee beans. The coffee making apparatus has a roaster for roasting unroasted dried coffee beans, a milling/extracting unit for milling the unroasted dried coffee beans into coffee granules and thereafter extracting coffee from the coffee granules, an air blower for blowing air into the milling/extracting unit, a pouring unit for pouring hot water onto the coffee granules to produce water-and-coffee-granule mixture, and a coffee server for receiving a coffee solution filtered from the water-and-coffee granule mixture.

However, at least the roasting of unroasted dried coffee beans, the cooling of the roasted coffee beans, the milling the cooled roasted coffee beans and the extracting coffee solution are carried out in a cycle in this order and thus the next coffee making cycle cannot be started until the extraction of the coffee solution by the milling/extracting unit or the reception of the coffee solution by a coffee server in the previous cycle ends. Since, therefore, the new step of roasting coffee beans cannot be carried out during the extraction process in the previous cycle, a lot of cups of coffee cannot be made at a high efficiency.

In this coffee making apparatus, hot water is uniformly poured by the pouring unit on the substantially whole upper surface of coffee granules deposited in the milling/extracting unit. In this respect, the layer-portion of the coffee granules lower than a rotary cutter is likely to become denser when a coffee solution is extracted from water-and-coffee-granule mixture by means of the milling/extracting unit provided, at the vicinity of the bottom portion thereof, with the rotary cutter. This coffee making apparatus, in which the uniform pouring step is employed, is encountered with a problem that the layer-portion of the coffee granules lower than the rotary cutter hinders extracted hot water from flowing down through a filter and a long time is required for the filtration of an extracted coffee solution. The apparatus has a further problem that a coffee solution to be extracted overflows from the milling/extracting unit. The apparatus has a still further problem that the milling/extracting unit cannot extract a coffee solution in an ideal manner.

SUMMARY OF THE INVENTION

The first object of this invention is to provide a coffee making apparatus which begins with the roasting of unroasted dried coffee beans and makes a lot of cups of coffee in a short time.

The second object of this invention is to provide a coffee making apparatus for extracting a coffee solution rapidly and making coffee with good flavor.

These objects are achieved with the present invention comprising a high capacity coffee maker with improved filtration. The coffee maker comprises a roaster, a tank for temporarily storing roasted coffee beans, a blower for cooling the roasted coffee beans the tank, a milling and extracting unit for milling the cooled roasted coffee beans and extracting coffee therefrom, and a server for receiving the coffee. In one embodiment of the invention, the coffee maker comprises means for controlling a first cycle of roasting and cooling and means for controlling an second cycle of milling and extracting, wherein the two control means can be operated in succession or separately, so that the two cycles can be operated in succession or simultaneously, as desired. An offset outlet may e included to improve filtration.

BRIEF DESCRIPTION OF THE DRAWINGS

FIG. 2 is a cross-sectional view taken along line A—A in FIG. 1;

FIG. 3 is a cross-sectional view taken along line B—B in FIG. 1;

FIG. 7 is a control block diagram showing the control of the elements of this embodiment by means of a microcomputer;

FIG. 9 is a flow chart of the first operation program memorized by the microcomputer.

DETAILED DESCRIPTION OF THE PREFERRED EMBODIMENTS

Figure 1:
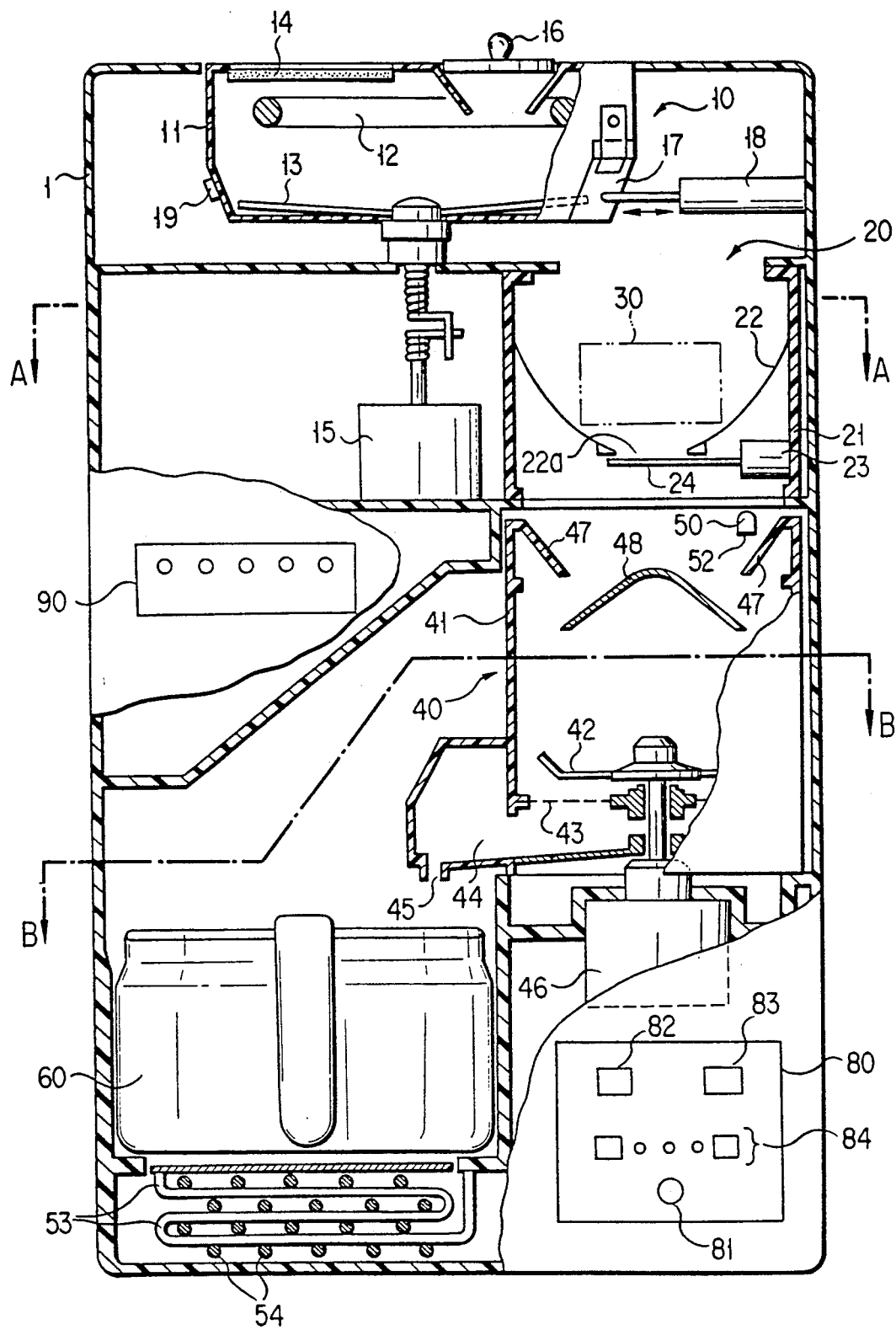
FIG. 1 is a longitudinal cross-sectional view of the overall coffee making apparatus according to one embodiment of this invention.

FIGS. 1 to 3 show a cross-sectional view of one embodiment of the coffee making apparatus according to this invention, a cross-sectional view thereof taken along line A—A in FIG. 1 and another cross-sectional view thereof taken along line B—B in FIG. 1, respectively.

A roaster 10 is provided in the upper portion of an outer casing 1. Below the roaster 10 in a state offset therefrom is disposed a temporarily storing tank 20 which receives roasted coffee beans falling from the roaster 10. An air blower 30 is placed so as to face the temporarily storing tank 20. A milling/extracting unit 40 is provided under the temporarily storing tank 20. A pouring unit 50 is provided so as to pour hot water into the milling/extracting unit 40. A coffee server 60 is removably disposed in the lower portion of the outer casing 1.

The roaster 10 is fixed to a horizontal frame of the casing 1 and used to roast unroasted dried coffee beans therein. A ring-shaped far-infrared heater 12 is placed in the upper portion of a cylindrical container 11. A stirring blade assembly 13 is provided in the container 11 so as to rotate along its bottom. A smoke-and-smell removing filter plate 14 is attached to the inner face of the upper wall of the container 11. In part of the upper wall of the container 11 is formed an unroasted dried coffee bean inlet which is selectively opened and closed by manually operating a lid 16 and through which unroasted coffee beans enter the container 11 and fill the same such that dried coffee beans are roasted. An outlet for discharging roasted coffee beans from the container 11 is formed in the lower portion of the peripheral wall of the container 11. The outlet is selectively opened and closed by the movement of a lid 17 hinged on the container 11 and operated by means of a solenoid 18. The stirring blade assembly 13 is connected to a stirring blade rotating motor 15 by means of a driving shaft consisting of a pair of spring coils engaged with each other and rotated by means of the motor 15.

A temperature sensor 19 is mounted on the container 11 so as to detect the degree of roasting of the coffee beans in the container 11.

Figure 4:
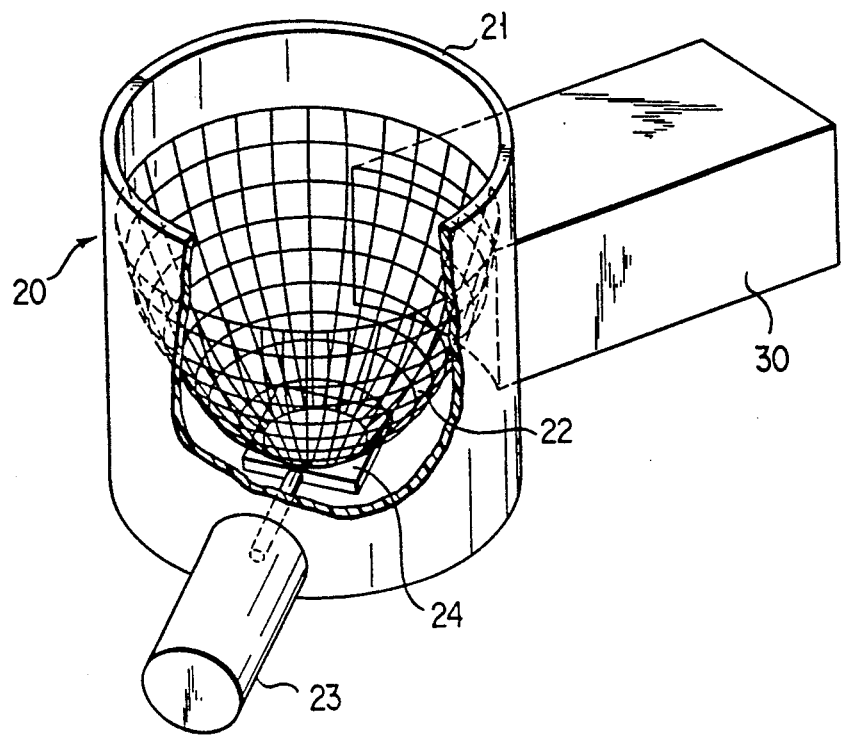
FIG. 4 is a partially cross-sectioned perspective view of the temporarily storing tank of this embodiment.

The temporarily storing tank 20 is provided right under the outlet of the roaster 10 and has a double-structure as clearly shown in FIG. 4. Specifically, the temporarily storing tank 20 has a cylindrical outer wall 21 having the upper and lower ends open and a bowl-shaped storing cage 22 provided in the outer wall 21, the cage 22 being made of rough meshes and having the opened end up. The cage 22 is fixed to the upper portion of the storing tank 20 at its upper periphery and supported thereby. Roasted coffee beans discharged from the roaster 10 are received by the storing cage 22. In the lowermost end of the storing cage 22 is formed an outlet 22a which is selectively opened and closed by the horizontal movements of a slide plate 24 operated by a solenoid 23. The air blower 30 extends through the outer wall 21 of the temporarily storing tank 20 such that the air blowing-out opening of the air blower 30 terminates between the wall 21 and cage 22 to face the storing cage 22. This arrangement allows air to blow into the cage 22 such that the roasted coffee beans in the cage 22 are cooled to a room temperature in a short time (2 to 3 minutes, for example).

It is usually said that it is better to hold the roasted coffee beans half a day as they are. Otherwise the following problems occur even if the coffee beans are fully roasted:

When water is not removed sufficiently, grass-smell is retained in the roasted coffee beans.

Pyrogallic acid which is changed from tannin makes coffee acrid and cloudy.

These problems are overcome by storing roasted coffee beans in the temporarily storing tank 20 and cooling the roasted coffee beans by means of the air blower 30. The roasted coffee beans are caused to drop in the temporarily storing tank 20 and are cooled to the room temperature in two to three minutes. Thereafter, they are milled and extracted by means of the later-described milling/extracting unit 40 such that coffee smelling very good and mixed with proper sourness and a proper bitter taste can be made.

Figure 5:
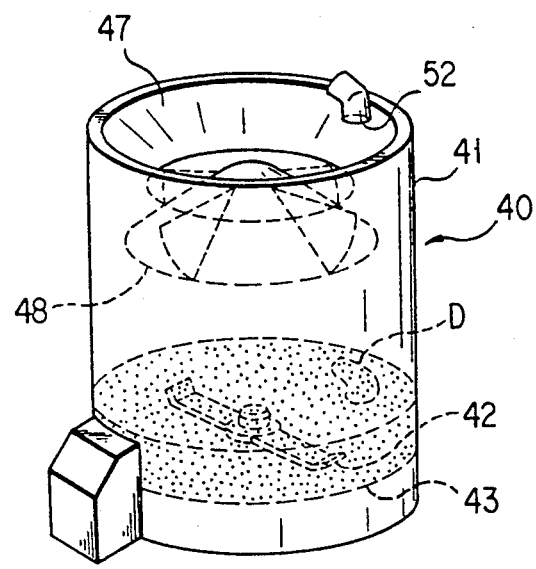
FIG. 5 is a perspective view of the milling/extracting unit of this embodiment.

As shown in the perspective view of FIG. 5, the milling/extracting unit 40 comprises a cylindrical mill case 41, a rotary cutter 42 for milling provided under the interior of the mill case 41, and a filter 43 provided at the lower open end of the mill case 41 so as to close the same. From the portion of the mill case 41, which is lower than the filter 41, extends a coffee solution outlet duct 44 from which liquid coffee falls into the coffee server 60. Dripping prevention means may be provided on the outlet 45. A mill motor 46 rotates the rotary cutter 42.

In the upper portion of the mill case 41 are disposed a pair of blocking members 47 and 48 for preventing coffee beans in the case 41 from being ejected out during the milling of coffee beans. One of the blocking members 47 has a reverse-circular-truncated-conical outer shape and constitutes an inner flange having a central circular opening. The other blocking member 48 has a reversed-cup outer shape with a lower edge diameter larger than the diameter of the central circular opening of the blocking member 47, and is disposed coaxially under the blocking member 47 such that the member 48 projects upwardly toward the central opening of the blocking member 47. Coffee beans falling from the temporarily storing tank 20 strike against the blocking members 47 and 48 and fall into the mill case 41 through plurality of slits formed between the blocking members 47 and 48.

The pouring unit 50 has a cartridge type water tank 51 (FIG. 3) detachably fixed to the outer casing 1, a pipe 53 disposed under the mount of the coffee server 60 for supplying water from the water tank 51 to a water outlet 52, and a pouring unit heater 54 for heating the pipe 53 and conducting heat-exchange. When the heater 54 is turned on, water in the pipe 53 is heated to a high temperature and is supplied to the water outlet 52. Then, the hot water is poured in the milling/extracting unit 40.

Figure 6:
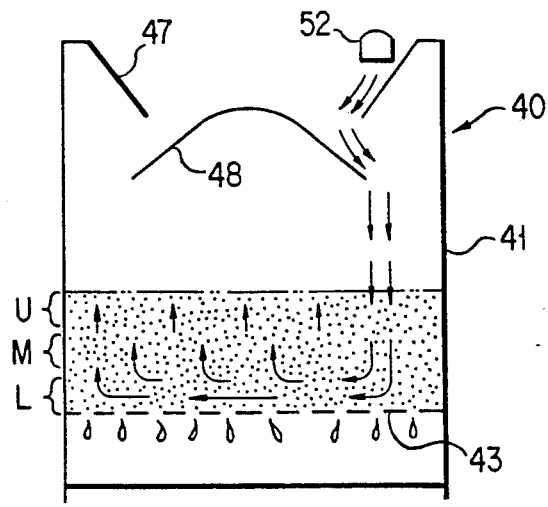
FIG. 6 is a view illustrating the state in which the extracting step is being performed by means of the milling/extracting unit.

The water outlet 52 is offset outwardly from the center of the milling/extracting unit 40, that is, it is disposed above the narrow portion of the inner flange 47. As shown in FIGS. 5 and 6, hot water poured from the water outlet 52 falls, through the limited portions of the blocking members 47 and 48, on the limited area D of the upper surface of the layer of coffee granules deposited in the milling/extracting unit 40. As shown in FIG. 5, the limited are D is offset from an axis of the rotary cutter 42.

Referring to FIG. 6, coffee granules made by milling roasted coffee beans entering the milling/extracting unit 40 by means of the rotary cutter 42 form a lower layer L which becomes finer and denser than other layers by being pressed by means of the rotary cutter 42 against the filter 43, a middle layer M consisting of coffee granules of a middle size, and an upper layer U consisting of coffee granules of a rough size. Bitter, the weakest, and most viscous coffee is extracted from the lower layer L. Strong and the most bitter coffee is extracted from the upper layer U. From the middle layer M is extracted coffee having a sour, intermediate taste between coffee extracted from the upper and lower layers.

If hot water is poured substantially evenly on the upper surface of the layered coffee granules, the lower layer L disturbs the hot water to reach the filter 43 and it takes a long time to filter the mixture of hot water and coffee granules and extract coffee and sometimes causes overflow of the mixture from the mill case 41. Coffee is separately extracted from each layer and does not taste good.

According to this invention, hot water falls only on the limited area D of the upper surface of the layered coffee granules and is naturally soaked downward into the layered granules until it reaches the lower layer L. In the lower layer L, the hot water is laterally soaked into the whole area of the lower layer L. As hot water is added, it is soaked into the middle layer M and then into the upper layer U. Finally, the hot water lifts whole coffee granules. In this state, the coffee granules of all layers are mixed with each other and coffee is substantially evenly extracted from each layer. When the filtration is finished, the upper surface of coffee grounds is rendered flat and becomes slightly bright (this state shows that coffee is completely extracted), and bubbles burst. These soaking steps and lifting step shorten and smooth the filtration of water-coffee mixture. The process of mixing coffee granules in all layers with each other allows for evenly extracting coffee from each layer in a mixed state, thereby making coffee having a good taste.

The operation of this apparatus is performed by means of a controller in a microcomputer 70. Referring to FIGS. 1 and 7, the microcomputer 70 receives signals from a full automatic switch 81, a first switch 82 and a second switch 83 provided on an operation panel 80, an adjuster 84 for adjusting the degree of roasting of coffee beans, the sensor 19 for detecting the roasting temperature of the roaster 10, etc. The microcomputer 70 sends the commands to the roasting heater 12, the stirring blade assembly 13, the solenoid 18, the air blower 30, the solenoid 23, the rotary cutter 42, the heater 54 for heating the pouring unit, etc. in the order according to the predetermined programming of the operation. The states of the operation are indicated on a display 90.

The microcomputer selects one operation from the following three operations:

a) a full automatic operation or cycle which comprises the steps beginning with the roasting of dried coffee beans and ending with the extracting of coffee;

b) a first operation which comprises the steps beginning with the roasting of dried coffee beans and ending with the cooling of roasted coffee beans in the temporarily storing tank 20 by an air flow generated by the air blower 30; and c) a second operation or cycle which comprises the steps beginning with the discharge of roasted beans from the temporarily storing tank 20 and ending with the filtering and extracting of coffee.

These operations will now be explained.

Figure 8:
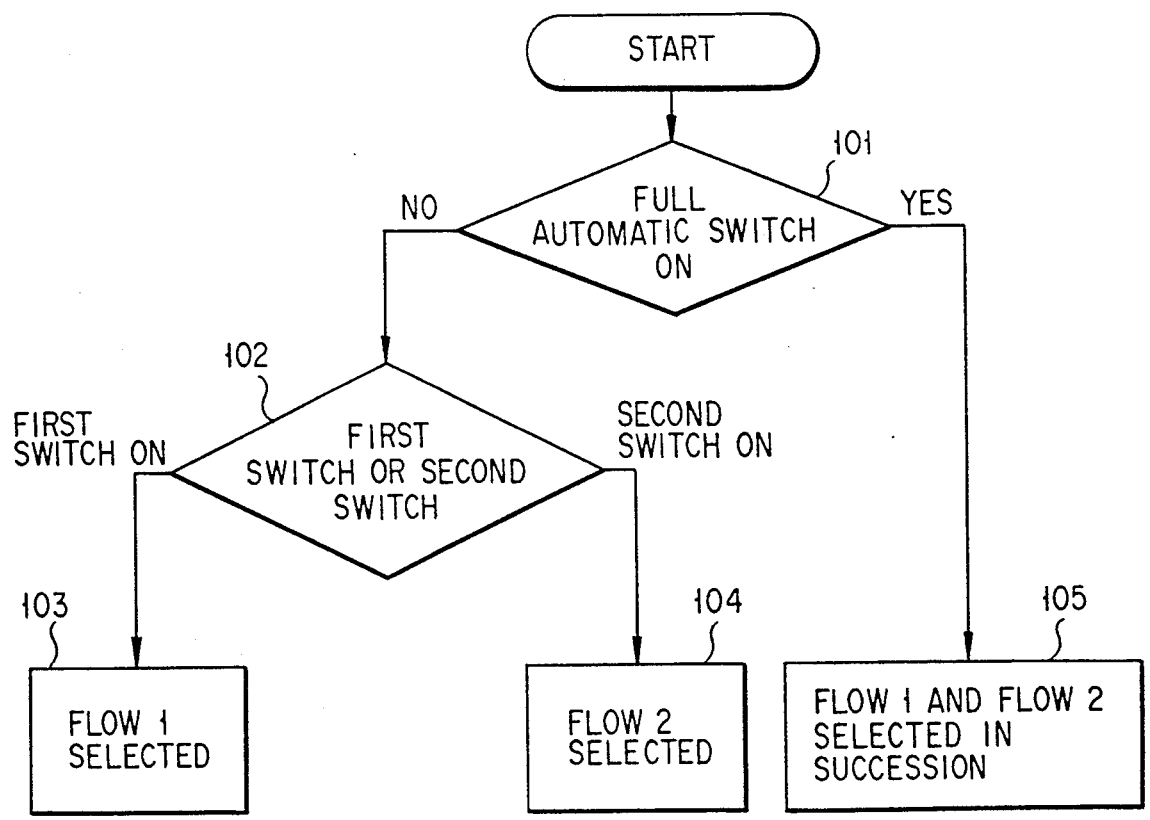
FIG. 8 is a flow chart of the control by means of the microcomputer in FIG. 7.
Figure 10:
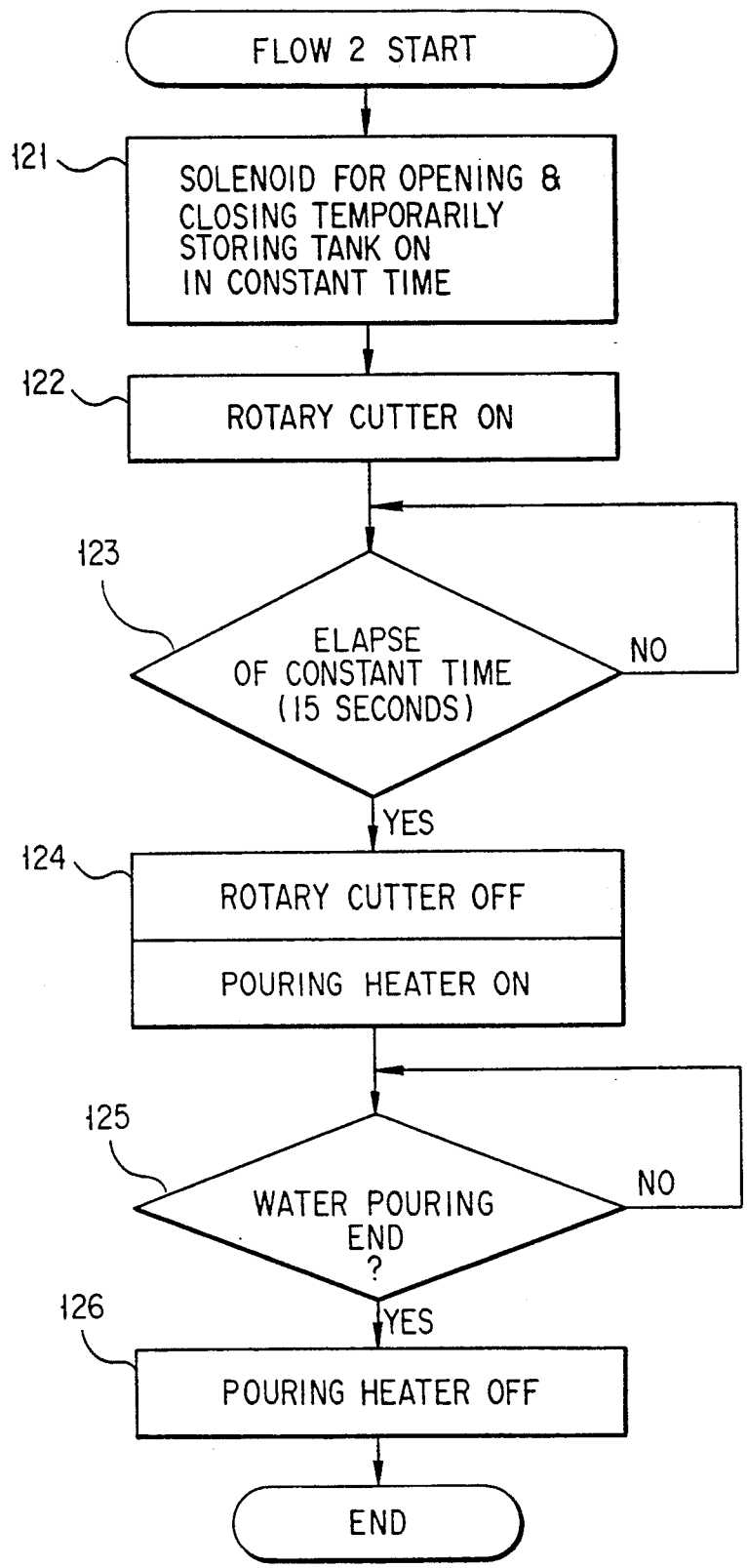
FIG. 10 is a flow chart of the second operation program memorized by the microcomputer.

Referring to FIG. 8, the microcomputer 70 checks or determines whether the full automatic switch 81 is turned on or off (Step 101). When the switch 81 is turned off, the process goes to Step 102. In case the first switch 82 is turned on, the program according to Flow 1 shown in FIG. 9 is selected, and the first operation starts (Step 103). On the other hand, when the switch 83 is turned on, the program according to Flow 2 shown in FIG. 10 is selected, and the second operation begins (Step 104). Suppose that the full automatic switch 81 is turned on in Step 101, then the steps of Flow 1 and Flow 2 are conducted in succession and the full automatic operation is initiated (Step 105).

The microcomputer 70 previously memorizes the program for performing the first operation (shown by Flow 1 in FIG. 9) and the program for performing the second operation (shown by Flow 2 in FIG. 10).

In the flow of the program for performing the first operation as shown in FIG. 9, the microcomputer 70 outputs the "on" signal of the roasting heater 12 and the "on" signal of the motor 15 of the stirring blade assembly 13 (Step 111). Then, the temperature sensor 19 detects whether the temperature of roasted coffee beans is above the predetermined value (Step 112). When the roasting is finished, the solenoid 18 of the roaster 10 is signaled to be opened (Step 113). After a constant time (which is the time required for causing roasted coffee beans to fall into the temporarily storing tank by means of the rotary blade assembly 13, generally 5 to 7 seconds)(Step 114), the roasting heater 12, the motor 15 and the solenoid 18 are turned off and the air blower 30 is turned on in a constant time (which is previously determined to be 2 to 3 minutes) (Step 115). In this way, the process beginning with the roasting of dried coffee beans and ending with the cooling and storing of roasted coffee beans is carried out. In Step 112, the roasting step may be time-controlled. The degree of roasting can be adjusted by changing the determining temperature by means of the roasting-degree adjuster 84 or by changing roasting time.

In the flow of program for performing the second operation as shown in FIG. 10, the solenoid 23 for opening and closing the temporarily storing tank 20 is operated in a constant time (Step 121) such that roasted coffee beans fall from the temporarily storing tank 20 into the milling/extracting unit 40. Then, the rotary cutter 42 is rotated (Step 122). In a constant time (for example, 15 seconds), the roasted coffee beans are milled to a moderate degree. After the constant time (Step 123), the rotary cutter 42 is turned off and the heater 54 of the pouring unit is actuated (Step 24). Water from the water tank 51 is heated in the pipe 53 and is poured into the milling/extracting unit 40. When a temperature sensor, a water switch (neither shown) or the like detects that there is no water in the water tank 51, the heater 54 is turned off so as to end the pouring step (Step 125).

By using both the first switch 82 and the second switch 83 well, the steps from the roasting to the cooling in the next cycle can be performed during the steps of milling roasted coffee beans and extracting coffee. Let it be assumed that the coffee making apparatus makes 12 cups of coffee in a cycle and each cycle lasts 20 minutes, then only 36 cups of coffee are made an hour in a full automatic operation. On the contrary, this apparatus has the merit that 72 cups of coffee can be made an hour by using both the first and second switches 82 and 83 alternately.

According to this invention, roasted coffee beans ar not directly put in the milling/extracting unit but are temporarily held in the temporarily storing tank such that the beans are temporarily held and cooled there. The temporarily storing tank provides the advantage that the roaster is not always operated together with the milling/extracting unit but both can be operated separately.

According to this invention, the steps from roasting to cooling and the steps from milling and extraction can be performed in parallel such that much time is saved for making a lot of cups of coffee. In other words, a lot of coffee can be made in a short time.

According to this invention, hot water is poured on the limited area of the upper surface of coffee granules deposited in the milling/extracting unit. The poured hot water reaches the lower layer of the coffee granules and thereafter is soaked into the granules from the lower layer to the upper layer, thereby lifting the whole layered granules and evenly extracting coffee from every layer. This facilitates the smooth extraction of coffee in a short time and, therefore, provides tasty coffee.

What is claimed is:

1. A coffee making apparatus comprising:
a roaster of roasting dried coffee beans;

a tank for temporarily sorting roasted coffee beans, wherein said tank is separate from said roaster;

first supplying means for supplying said roasted coffee beans to said tank;

blowing means for sending air to said roasted coffee beans in said tank to cool said roasted coffee beans;

milling and extracting means for milling said cooled roasted coffee beans to form coffee granules and for thereafter extracting a coffee solution therefrom;

second supplying means for supplying said cooled roasted coffee beans into said milling and extracting means;

a coffee server for receiving said coffee solution which has been extracted; and a case in which said roaster, said tank, said first supplying means, said milling and extracting means, and said second supplying means are provided;

wherein said tank has a meshed cage for holding said roasted coffee beans and a cylindrical member for supporting said meshed cage, and said blowing means has an air outlet extending through said cylindrical member and facing said meshed cage.

2. A coffee making apparatus comprising:

a roaster for roasting dried coffee beans;

a tank for temporarily storing roasted coffee beans, wherein said tank is separate from said roaster;

first supplying means for supplying said roasted coffee beans to said tank;

blowing means for sending air to said roasted coffee beans in said tank to cool said roasted coffee beans;

milling and extracting means for milling said cooled roasted coffee beans to form coffee granules and for thereafter extracting a coffee solution therefrom;

second supplying means for supplying said cooled roasted coffee beans into said milling and extracting means;

a coffee server for receiving said coffee solution which has been extracted; and a case in which said roaster, said tank, said first supplying means, said milling and extracting means, and said second supplying means are provided;

and further comprising first control means for controlling a first cycle wherein said dried coffee beans are roasted by means of said roaster and said roasted coffee beans are cooled in said tank, second control means for controlling a second cycle wherein said cooled roasted coffee beans are supplied into said milling and extracting means from said tank and said cooled roasted coffee beans are milled and said coffee solution is extracted from said coffee granules by means of said milling and extracting means, and determination means for determining whether the first and second control means are automatically operated in succession or separately operated.

3. The apparatus according to claim 2 further comprising:

a pouring outlet for pouring hot water on a limited area of an upper surface of said coffee granules deposited in said milling and extracting means.

4. The apparatus according to claim 3, wherein said milling and extracting means comprises an cylindrical mill case having both ends opened, a rotary cutter for milling provided in a lower portion of said mill case and a filter provided under said rotary cutter, and said limited area is offset from an axis of rotation of said rotary cutter.

5. A coffee making apparatus comprising:

a roaster including a container for receiving dried coffee beans and means for roasting dried coffee beans in the container, the container having an outlet;

a tank for temporarily storing roasted coffee beans, the tank being separated form the roaster and having an open end positioned under the outlet of the container for receiving roasted coffee beans which fall down from the outlet;

blowing means for sending air to said roasted coffee beans in said tank to cool said roasted coffee beans;

milling and extracting means for milling said cooled roasted coffee beans to form coffee granules and for thereafter extracting a coffee solution therefrom;

a coffee server for receiving said coffee solution which has been extracted;

wherein said tank includes an outer peripheral wall having one end defining said open end and the other end defining an outlet opening, and said milling and extracting means is disposed under the outlet opening.

6. The apparatus according to claim 5 wherein said tank is positioned under the container by a predetermined distance, and positioned above the milling and extracting means by a predetermined distance, so that cooled coffee beans fall into the milling and extracting means by their weight.

7. The apparatus according to claim 5 wherein said blowing means includes a blower for blowing air into the tank through the outer peripheral wall.

* * * * *

UNITED STATES PATENT AND TRADEMARK OFFICE
CERTIFICATE OF CORRECTION

PATENT NO. : 5,322,005
DATED : June 21, 1994
INVENTOR(S) : Kazuo ENOMOTO

It is certified that error appears in the above-indentified patent and that said Letters Patent is hereby corrected as shown below:

Title page,
After "[73] Assignee: Nichimen Corporation, Tokyo, Japan"
please add -- and Kazuo ENOMOTO, Hyogo-ken, Japan--.

Signed and Sealed this

Fourteenth Day of February, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,322,005
DATED : June 21, 1994
INVENTOR(S) : Kazuo Enomoto

It is certified that error appears in the above-indentified patent and that said Letters Patent is hereby corrected as shown below:

| Col. | line | |
|---|---|---|
| 1 | 24 | Change "unroasted" to --roasted--. |
| 1 | 14 | Before "second" change "an" to --a --. |
| 2 | 18 | After "may" change "e" to --be--. |
| 6 | 26 | Change "24" to --124--. |
| 6 | 44 | Change "ar" to --are--. |
| 6 | 68 | After "roaster" change "of" to --for--. |
| 7 | 1 | Change "sorting" to --storing--. |
| 8 | 13 | After "comprises" change "an" to --a--. |

Signed and Sealed this

Sixteenth Day of May, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,322,005
DATED : June 21, 1994
INVENTOR(S) : Kazuo ENOMOTO

It is certified that error appears in the above-indentified patent and that said Letters Patent is hereby corrected as shown below:

| Column | Line | |
|--------|------|---|
| 1 | 24 | Change "unroasted" to --roasted--. |
| 2 | 14 | Before "second" change "an" to --a--. |
| 2 | 18 | After "may" change "e" to --be--. |
| 6 | 26 | Change "24" to --124--. |
| 6 | 44 | Change "ar" to --are--. |
| 6 | 68 | After "roaster" change "of" to --for--. |
| 7 | 1 | Change "sorting" to --storing--. |
| 8 | 13 | After "comprises" change "an" to --a--. |

This certificate supersedes Certificate of Correction issued May 16, 1995.

Signed and Sealed this

First Day of October, 1996

Attest:

BRUCE LEHMAN

*Attesting Officer*  *Commissioner of Patents and Trademarks*